United States Patent
Ko et al.

(10) Patent No.: US 11,427,509 B2
(45) Date of Patent: Aug. 30, 2022

(54) CEMENT ADDITIVE COMPOSITION COMPRISING POLYCARBOXYLIC ACID-BASED COPOLYMER

(71) Applicant: LG Chem, Ltd., Seoul (KR)

(72) Inventors: Chang Bum Ko, Daejeon (KR); Dong Jo Ryu, Daejeon (KR); Im Gyu Kim, Daejeon (KR); Hyo Min Kim, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/095,804

(22) PCT Filed: Dec. 8, 2017

(86) PCT No.: PCT/KR2017/014404
§ 371 (c)(1),
(2) Date: Oct. 23, 2018

(87) PCT Pub. No.: WO2018/124536
PCT Pub. Date: Jul. 5, 2018

(65) Prior Publication Data
US 2019/0127277 A1    May 2, 2019

(30) Foreign Application Priority Data

Dec. 26, 2016 (KR) .................. 10-2016-0179503
Dec. 7, 2017 (KR) .................. 10-2017-0167553

(51) Int. Cl.
| | |
|---|---|
| C04B 24/26 | (2006.01) |
| C04B 26/10 | (2006.01) |
| C04B 24/32 | (2006.01) |
| C08L 33/08 | (2006.01) |
| C08F 220/26 | (2006.01) |
| C08F 216/14 | (2006.01) |
| C08F 220/28 | (2006.01) |
| C04B 103/30 | (2006.01) |
| C04B 103/32 | (2006.01) |
| C08F 222/10 | (2006.01) |

(52) U.S. Cl.
CPC ...... *C04B 24/2647* (2013.01); *C04B 24/2688* (2013.01); *C04B 24/32* (2013.01); *C04B 26/10* (2013.01); *C08F 216/1433* (2020.02); *C08F 220/26* (2013.01); *C08F 220/286* (2020.02); *C08L 33/08* (2013.01); *C04B 2103/302* (2013.01); *C04B 2103/304* (2013.01); *C04B 2103/308* (2013.01); *C04B 2103/32* (2013.01); *C08F 222/102* (2020.02)

(58) Field of Classification Search
CPC ............ C04B 24/2688; C04B 24/2647; C04B 2103/32; C04B 2103/302; C04B 2103/304; C04B 2103/308
See application file for complete search history.

(56) References Cited

U.S. PATENT DOCUMENTS

| | | | |
|---|---|---|---|
| 5,661,206 A | 8/1997 | Tanaka et al. | |
| 2006/0281886 A1* | 12/2006 | Bichler | C08F 220/26 526/317.1 |
| 2015/0203402 A1* | 7/2015 | Ko | C04B 24/163 524/3 |
| 2015/0291716 A1* | 10/2015 | Liu | C08F 220/06 524/833 |

FOREIGN PATENT DOCUMENTS

| | | |
|---|---|---|
| JP | 2011032132 A | 2/2011 |
| JP | 2014031296 A | 2/2014 |
| JP | 2016505489 A | 2/2016 |
| JP | 2016145126 A | 8/2016 |
| KR | 20040009222 A | 1/2004 |
| KR | 20140031145 A | 3/2014 |
| KR | 20150015991 A | 2/2015 |
| KR | 20160056041 A | 5/2016 |

OTHER PUBLICATIONS

International Search Report for Application No. PCT/KR2017/014404 dated Apr. 6, 2018.

* cited by examiner

*Primary Examiner* — Karuna P Reddy
(74) *Attorney, Agent, or Firm* — Lerner, David, Littenberg, Krumholz & Mentlik, LLP

(57) ABSTRACT

The present disclosure relates to a cement additive composition including a polycarboxylic acid-based copolymer. When the cement additive composition of the present disclosure is used for cement formulation, it may improve fluidity of the composition even in a high water reducing ratio range of the particle and effectively prevent slump loss of the cement formulation, while improving initial dispersibility due to excellent water reducing performance.

6 Claims, No Drawings

CEMENT ADDITIVE COMPOSITION COMPRISING POLYCARBOXYLIC ACID-BASED COPOLYMER

CROSS-REFERENCE TO RELATED APPLICATIONS

The present application is a national phase entry under 35 U.S.C. § 371 of International Application No. PCT/KR2017/014404 filed Dec. 8, 2017, which claims priority from Korean Patent Application No. 10-2016-0179503 filed Dec. 26, 2016 and Korean Patent Application No. 10-2017-0167553 filed Dec. 7, 2017, all of which are incorporated herein by reference.

TECHNICAL FIELD

The present disclosure relates to a cement additive composition including a polycarboxylic acid-based copolymer.

BACKGROUND OF ART

Cement pastes prepared by mixing cement, water, and other additives, mortar prepared by adding sand to the cement paste, and concrete prepared by further adding and mixing large aggregates such as gravel in the cement paste and mortar are used in large amounts as a variety of construction materials and the like.

However, the construction materials including cement start to harden over time due to a hydration reaction between the cement and water, and thus workability thereof is gradually deteriorated. In this case, additional water may be added to enhance workability, but that may cause compression strength of the cement construction material to be lowered and cause cracks to occur. Therefore, a total amount of water used is limited.

In particular, concrete requires completion of all tasks, ranging from concrete mixing to concrete pouring, within a short period of time, because slump generally begins to deteriorate from about 30 minutes after mixing. Thus, various cement additives have been developed to maintain dispersibility of the cement formulation while reducing the amount of water used.

That is, various cement dispersants have been used in order to increase the fluidity of the cement formulation. However, when a highly water-reduced hydraulic composition is prepared using the cement dispersant, there is a problem that the slump loss is remarkable and workability and processability are deteriorated.

Accordingly, conventionally, there has been an attempt to use a water soluble polycarboxylic acid-based copolymer having a slump loss preventing property as a cement dispersant in order to prevent the slump loss. Examples of the water soluble polycarboxylic acid-based copolymer include a water soluble vinyl copolymer obtained by copolymerizing a methacrylic acid salt, a copolymer of maleic anhydride and an alkenyl ether, and the like.

However, in the conventional method using the water soluble copolymer as a cement dispersant, the effect of preventing slump loss is insufficient, and the effect changes and deteriorates over time. Also, there is a problem that setting delay is significant.

Accordingly, there is a demand for a technique that is capable of solving this problem.

DETAILED DESCRIPTION OF THE INVENTION

Technical Problem

The present disclosure relates to a cement additive composition including a polycarboxylic acid-based copolymer capable of effectively preventing slump loss as well as improving initial dispersibility due to excellent water reducing performance without adding a separate water reducing agent or slump retaining agent.

Technical Solution

The present disclosure provides a cement additive composition including a polycarboxylic acid-based copolymer, wherein the polycarboxylic acid-based copolymer includes an alkoxypolyalkylene glycol (meth)acrylic acid ester-based repeating unit, a polyalkylene glycol ether-based repeating unit, and a (meth)acrylic acid-based repeating unit, and is cross-linked by an ethylene glycol di(meth)acrylate-based cross-linking agent.

Advantageous Effects

When the cement additive composition of the present disclosure is used for cement formulation, it may improve fluidity of the composition even in a high water reducing ratio range of particles and effectively prevent slump loss of the cement formulation, while improving initial dispersibility due to excellent water reducing performance.

DETAILED DESCRIPTION OF THE EMBODIMENTS

The terminology used herein is for the purpose of describing particular embodiments only and is not intended to be limiting of the invention. The singular forms are intended to include the plural forms as well, unless the context clearly indicates otherwise. It will be further understood that the terms "include", "have", and "possess" when used in this specification, specify the presence of stated features, steps, components, or combinations thereof, but do not preclude the presence or addition of one or more other features, steps, components, or combinations thereof.

As the present invention can be variously modified and have various forms, specific embodiments thereof are shown by way of examples and will be described in detail. However, it is not intended to limit the present invention to the particular form disclosed, and it should be understood that the present invention includes all modifications, equivalents, and replacements within the idea and technical scope of the present invention.

Hereinafter, the cement additive composition of the present disclosure will be described in detail.

The cement additive composition according to one aspect of the present disclosure includes a polycarboxylic acid-based copolymer, wherein the polycarboxylic acid-based copolymer includes an alkoxypolyalkylene glycol (meth)acrylic acid ester-based repeating unit, a polyalkylene glycol ether-based repeating unit, and a (meth)acrylic acid-based repeating unit, and is cross-linked by an ethylene glycol di(meth)acrylate-based cross-linking agent.

The polycarboxylic acid-based copolymer included in the cement additive composition of the present disclosure includes the above-described repeating units, and cross-linking is formed by an ethylene glycol di(meth)acrylate-based cross-linking agent in each repeating unit. Therefore, it provides excellent dispersibility as compared with conventional cement additives, and may increase fluidity of the cement formulation even in a high water reducing ratio range, prevent reduction over time in the improved fluidity for a long period of time, and impart good workability to the cement formulation.

According to an embodiment of the present disclosure, the alkoxypolyalkylene glycol (meth)acrylic acid ester-based repeating unit may be derived from a monomer represented by the following Chemical Formula 1.

[Chemical Formula 1]

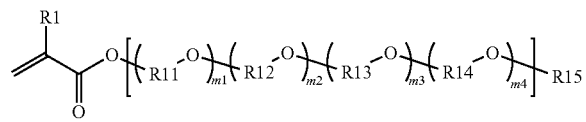

In Chemical Formula 1,
R1 is hydrogen or a C1 to C3 alkyl,
R11 to R14 are the same as or different from each other, and each is independently a C1 to C4 alkylene,
m1 to m4 are the number of moles of the added alkylene oxide repeating unit, which are the same as or different from each other, and each is independently an integer of 0 to 200, and m1+m2+m3+m4 is 50 to 200,
wherein a random or block form can be formed by a mixed composition of one or more kinds of the alkylene oxides, and
R15 is hydrogen or a C1 to C4 alkyl.

This alkoxypolyalkylene glycol (meth)acrylic acid ester-based monomer contains an unsaturated double bond capable of participating in a radical reaction. Therefore, the monomer can be copolymerized with other monomers, and electrostatic repulsive force can be induced between the dispersed particles, so that dispersibility and stability of the particles can be enhanced. Further, due to this principle, it is possible to maintain slump fluidity for a long time and to prevent the cement formulation from changing over time.

Particularly, when the number of moles of the added alkylene oxide repeating unit represented by m1 to m4 is about 50 to about 200, dispersibility and slump retention can be further increased, and the number of moles of the added repeating unit is preferably about 50 to about 150.

Examples of the monomer represented by Chemical Formula 1 may include, for example, methoxypolyethylene glycol (meth)acrylate, methoxypolypropylene glycol (meth)acrylate, methoxypolybutylene glycol (meth)acrylate, methoxypolyethylene glycol polypropylene glycol (meth)acrylate, methoxypolyethylene glycol polybutylene glycol (meth)acrylate, methoxypolypropylene glycol polybutylene glycol (meth)acrylate, methoxypolyethylene glycol polypropylene glycol polybutylene glycol (meth)acrylate, ethoxypolyethylene glycol (meth)acrylate, ethoxy polypropylene glycol (meth)acrylate, ethoxy polybutylene glycol (meth)acrylate, ethoxy polyethylene glycol polypropylene glycol (meth)acrylate, ethoxypolyethylene glycol polybutylene glycol (meth)acrylate, ethoxypolypropylene glycol polybutylene glycol (meth)acrylate, and ethoxypolyethylene glycol polypropylene glycol polybutylene glycol (meth)acrylate, and these may be used alone or in combination.

The polyalkylene glycol ether-based repeating unit may be derived from a monomer represented by the following Chemical Formula 2.

[Chemical Formula 2]

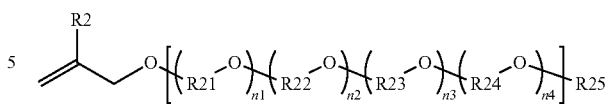

In Chemical Formula 2,
R2 is hydrogen or a C1 to C3 alkyl,
R21 to R24 are the same as or different from each other, and each is independently a C1 to C4 alkylene,
n1 to n4 are the number of moles of the added alkylene oxide repeating unit, which are the same as or different from each other, and each is independently an integer of 0 to 200, and n1+n2+n3+n4 is 50 to 200,
wherein a random or block form can be formed by a mixed composition of one or more kinds of the alkylene oxides, and
R25 is hydrogen or a C1 to C4 alkyl.

This polyalkylene glycol ether-based monomer also contains an unsaturated double bond capable of participating in a radical reaction. Therefore, the monomer can be copolymerized with other monomers, and the degree of polarity which can partially appear in the entire polycarboxylic acid copolymer can be controlled to efficiently increase the adsorption rate and adsorption degree of the cement particles, thereby improving the initial fluidity when the cement is mixed.

Examples of the monomer represented by the Chemical Formula 2 may include, for example, methoxypolyethylene glycol (meth)allyl ether, ethoxypolyethylene glycol (meth)allyl ether, propoxypolyethylene glycol (meth)allyl ether, butoxypolyethylene glycol (meth)allyl ether, phenoxypolyethylene glycol (meth)allyl ether, polyethylene glycol vinyl ether, polyethylene glycol monoallyl ether, and polyethylene glycol (meth)allyl ether, and these may be used alone or in combination.

According to an embodiment of the present disclosure, the polyalkylene glycol ether-based repeating unit may be used in an amount of about 50 to about 150 parts by weight, preferably about 70 to about 120 parts by weight, based on 100 parts by weight of the alkoxypolyalkylene glycol (meth)acrylic acid ester-based repeating unit.

When the polyalkylene glycol ether-based repeating unit is included in a relatively small amount, the slump loss may occur quickly and thus the fluidity may be deteriorated. When the polyalkylene glycol ether-based repeating unit is included in a relatively large amount, the initial dispersibility may be deteriorated.

The polycarboxylic acid-based copolymer included in the cement additive composition according to one aspect of the present disclosure includes a (meth)acrylic acid-based repeating unit.

The (meth)acrylic acid-based repeating unit may be derived from a monomer represented by the following Chemical Formula 3.

[Chemical Formula 3]

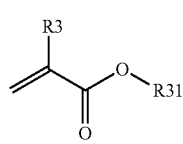

In Chemical Formula 3,

R3 is hydrogen or a C1 to C3 alkyl, and

R31 is hydrogen, a monovalent or divalent metal ion, an ammonium ion, or a primary to quaternary ammonium ion.

The (meth)acrylic acid-based repeating unit can increase functional groups that are capable of being adsorbed onto the cement particles in the polycarboxylic acid-based copolymer, thereby improving the initial dispersibility of the cement composition.

The monomer represented by the Chemical Formula 3 may be, for example, at least one selected from the group consisting of acrylic acid, methacrylic acid, metal salts, ammonium salts, and organic amine salts of these acids.

According to an embodiment of the present disclosure, the (meth)acrylic acid-based repeating unit may be used in an amount of about 10 to about 50 parts by weight, preferably about 20 to about 40 parts by weight, based on 100 parts by weight of the alkoxypolyalkylene glycol (meth)acrylic acid ester-based repeating unit.

When the (meth)acrylic acid-based repeating unit is included in a relatively small amount, the initial dispersibility may be deteriorated. When the (meth)acrylic acid-based repeating is included in a relatively large amount, the initial dispersibility may increase, but the slump loss may occur quickly.

In the polycarboxylic acid-based copolymer included in the cement additive composition according to one aspect of the present disclosure, the above-described repeating units are cross-linked by an ethylene glycol di(meth)acrylate-based cross-linking agent.

Due to the cross-linking, the polycarboxylic acid-based copolymer increases the adsorption rate onto the cement particles, thereby inducing inter-particle dispersion due to steric repulsion. Therefore, it improves the initial water reducing performance and retaining ability in the cement formulation, thereby realizing an effect of giving excellent workability for a long time.

Examples of the ethylene glycol di(meth)acrylate-based cross-linking agent may include, for example, polyethylene glycol diacrylate (PEGDA), polypropylene glycol diacrylate (PPGDA), 1,6-hexanediolethoxylate diacrylate, 1,6-hexanediolpropoxylate diacrylate, neopentylene glycol ethoxylate diacrylate, neopentylene glycol propoxylate diacrylate, trimethyl propane ethoxylate triacrylate, trimethyl propane propoxylate triacrylate, pentaerythritol ethoxylate triacrylate, and pentaerythritol propoxylate triacrylate, and these may be used alone or in combination.

According to an embodiment of the present disclosure, the cross-linking agent may be used in an amount of about 0.01 to about 0.5 parts by weight, preferably about 0.05 to about 0.3 parts by weight, based on 100 parts by weight of the alkoxypolyalkylene glycol (meth)acrylic acid ester-based repeating unit.

When the cross-linking agent is included in a relatively small amount, the initial dispersibility and compression strength may be deteriorated. When the cross-linking agent is included in a relatively large amount, the initial dispersibility may be deteriorated, and thus the workability may be deteriorated.

Meanwhile, the polycarboxylic acid-based copolymer included in the cement additive composition according to an embodiment of the present disclosure necessarily includes an alkoxypolyalkylene glycol (meth)acrylic acid ester-based repeating unit, a polyalkylene glycol ether-based repeating unit, and a (meth)acrylic acid-based repeating unit, and cross-linking should be formed by an ethylene glycol di(meth)acrylate-based cross-linking agent. By such a combination, the slump loss can be effectively prevented when the cement additive composition is added to cement, and at the same time, excellent compressive strength can be maintained even after a certain period of time after mixing.

Particularly, in the case of lacking the repeating unit derived from any one of the above-mentioned monomers, or lacking cross-linking by the above-mentioned cross-linking agent even if all the repeating units are included, problems due to the slump loss may occur and compressive strength may greatly be decreased.

The polycarboxylic acid-based copolymer may be added as it is and used as a component of the cement formulation. If necessary, the copolymer may be added in the form of salts by reacting with a basic substance, and then used as a component of the cement formulation.

For example, the basic substance may be hydroxides, chlorides, and carbonates of monovalent or divalent metals, ammonia, or primary to tertiary amines.

When the polycarboxylic acid-based copolymer is used in the form of salts, slump retaining ability and proper air entraining ability of the cement composition can be obtained. The salt form is preferably contained in an amount of about 10 to about 50 wt % based on a total weight of the polycarboxylic acid-based copolymer.

The polycarboxylic acid-based copolymer included in the cement additive composition according to one aspect of the present disclosure may be prepared by copolymerizing the monomer components using a polymerization initiator. As the copolymerization method, polymerization methods generally used in the technical field of the present invention such as solution polymerization, bulk polymerization, or the like may be used without any particular limitation.

For example, when solution polymerization is performed using water as a solvent, a water soluble polymerization initiator such as a persulfate of ammonium or an alkali metal, hydrogen peroxide, or the like may be used as a solution polymerization initiator. In polymerization using a lower alcohol, an aromatic hydrocarbon, an aliphatic hydrocarbon, an ester compound, or a ketone compound as a solvent, hydroperoxides such as benzoyl peroxide, lauroyl peroxide, and cumene hydroperoxide, or aromatic azo compounds such as azobisisobutyronitrile and the like, may be used as a polymerization initiator. Herein, an accelerator such as an amine compound or the like may be used in combination therewith.

In addition, when a mixed solvent of water and lower alcohol is used, the above polymerization initiators or combinations of the polymerization initiators and accelerators may be appropriately used.

A suitable amount of the polymerization initiator may be 0.5 to 5 parts by weight based on 100 parts by weight of the monomer. The polymerization temperature may vary depending on the kinds of the solvent or polymerization initiator, but may be selected within a range of, for example, about 0 □ to about 120 □.

In addition, a thiol-based chain transfer agent may be used to control the molecular weight of the obtained polycarboxylic acid-based copolymer.

The thiol-based chain transfer agent may be at least one selected from the group consisting of mercaptoethanol, thioglycerol, thioglycolic acid, 2-mercapto propionic acid, 3-mercaptopropionic acid, thiomalic acid, thioglycolic acid octyl, and 3-mercaptopropionic acid octyl.

The amount of the thiol-based chain transfer agent may be, for example, about 0.01 to about 5 parts by weight based on 100 parts by weight of the monomer.

In a specific embodiment, it is preferable that the polycarboxylic acid-based copolymer and a copolymer salt obtained by neutralizing the same have a weight average molecular weight of about 30,000 to about 50,000, about 33,000 to about 40,000, or about 35,000 to about 38,000, when measured by gel permeation chromatography (GPC), in terms of dispersibility when mixed with cement.

The cement additive composition may be used in an amount of about 0.01 to about 10 parts by weight, preferably about 0.05 to about 5 parts by weight, or about 0.1 to about 5 parts by weight, based on 100 parts by weight of the cement formulation.

When the cement additive composition is included in an excessively small amount relative to the whole cement formulation, it may be difficult to exhibit the performance such as slump retaining ability, water reducing performance, air entraining ability, and the like. When the cement additive composition is included in an excessively large amount relative to the whole cement composition, economic efficiency may be low.

Hereinafter, the function and effect of the present invention will be described in more detail through specific examples of the present invention. However, these examples are for illustrative purposes only, and the invention is not intended to be limited by these examples.

EXAMPLES

Example 1

Polymerization of Polycarboxylic Acid-Based Copolymer 200 parts by weight of water was added to a 2 L glass reactor equipped with a thermometer, a stirrer, a dropping funnel, a nitrogen feed tube, and a reflux cooler, and the inside of the reactor was replaced with nitrogen while stirring, followed by heating to 70 □ under a nitrogen atmosphere.

Subsequently, 20 parts by weight of a 3 wt % aqueous ammonium persulfate solution was added to the reactor and completely dissolved. Thereafter, a polymerization composition was prepared by mixing an aqueous monomer solution containing:

i) a methoxypolyethylene glycol (meth)acrylic acid ester-based monomer (number of moles of added alkylene oxide repeating unit: 50), ii) a methoxypolyethylene glycol methallyl ether (number of moles of added alkylene oxide repeating unit: 50), iii) an acrylic acid, and iv) a polyethylene glycol diacrylate cross-linking agent (number of moles of added alkylene oxide repeating unit: 10);

90 parts by weight of water;

a mixed solution of 3.0 parts by weight of 2-mercaptoethanol and 30 parts by weight of water; and 70 parts by weight of a 3 wt % aqueous ammonium persulfate solution, and then added dropwise to the reactor for 4 hours.

Then, 10 parts by weight of a 3 wt % aqueous ammonium persulfate solution was added again thereto at once.

Thereafter, reaction continued for 1 hour and the temperature was maintained at 70 □ to complete the reaction.

After the polymerization was completed, the obtained polymer was cooled to room temperature and neutralized with a 30 wt % aqueous sodium hydroxide solution for about 1 hour to a solid content of 50%.

The weight average molecular weight of the obtained water soluble copolymer salt was 38,000, when measured by gel permeation chromatography (GPC).

Examples 2 to 5 and Comparative Examples 1 to 5

Polymerization of Polycarboxylic Acid-Based Copolymer

Polymerization was completed in the same manner as in Example 1, except that the composition was changed. Each composition and weight average molecular weight are shown in Table 1 below.

TABLE 1

| | Alkoxypolyalkylene glycol (meth)acrylic acid ester-based monomer | | Polyalkylene glycol ether-based monomer | | (Meth) acrylic acid-based | Cross-linking agent | | Weight |
|---|---|---|---|---|---|---|---|---|
| | Number of moles of added EO | Amount (parts by weight) | Number of moles of added EO | Amount (parts by weight) | monomer Amount (parts by weight) | Number of moles of added EO | Amount (parts by weight) | average molecular weight (g/mol) |
| Ex. 1 | 50 | 200 | 50 | 200 | 60 | 10 | 0.125 | 38,000 |
| Ex. 2 | 50 | 200 | 50 | 200 | 60 | 10 | 0.25 | 37,000 |
| Ex. 3 | 100 | 200 | 100 | 200 | 60 | 10 | 0.5 | 35,000 |
| Ex. 4 | 50 | 200 | 50 | 300 | 60 | 10 | 0.25 | 37,500 |
| Ex. 5 | 50 | 200 | 50 | 100 | 60 | 10 | 0.25 | 36,000 |
| Comp. Ex. 1 | 50 | 400 | — | — | 60 | — | — | 29,000 |
| Comp. Ex. 2 | — | — | 50 | 400 | 60 | — | — | 28,000 |
| Comp. Ex. 3 | 50 | 200 | 50 | 200 | 60 | — | — | 28,500 |
| Comp. Ex. 4 | 50 | 200 | 50 | 200 | 30 | — | — | 29,000 |
| Comp. Ex. 5 | 50 | 400 | — | — | 46.8 | 10 | 0.32 | 29,500 |

Experimental Examples 7.5 kg of Portland cement (SsangYong Cement), 16.5 kg of sand, 19.0 kg of gravel, 0.2 wt % (based on the weight of cement) of each polycarboxylic acid-based copolymer prepared in the examples and comparative examples, and 3.0 kg of water (tap water) were mixed to prepare concrete.

Slump of each prepared concrete was measured in accordance with Korean Industrial Standard KS F 2402, and compression strength was measured in accordance with Korean Industrial Standard KS F 2405.

The results are shown in Table 2 below.

TABLE 2

| | Slump (cm) | | Compression strength (MPa) | |
|---|---|---|---|---|
| | Initial | 60 min after mixing | 3 days after mixing | 7 days after mixing |
| Example 1 | 22 | 21 | 33 | 42 |
| Example 2 | 21.5 | 21 | 33 | 43 |
| Example 3 | 21 | 20.5 | 34 | 42 |
| Example 4 | 21.5 | 21 | 33 | 43 |
| Example 5 | 21 | 20.5 | 34 | 42 |
| Comp. Example 1 | 19 | 17 | 28 | 36 |
| Comp. Example 2 | 19 | 17 | 27 | 37 |
| Comp. Example 3 | 19.5 | 17.5 | 27 | 37 |
| Comp. Example 4 | 21 | 20.5 | 28 | 37 |
| Comp. Example 5 | 21.5 | 20.5 | 28 | 38 |

Referring to Table 2, it can be clearly confirmed that the cement additive compositions according to the examples of the present disclosure effectively prevent the initial slump loss when added to cement, as compared with the comparative examples. Specifically, in the case of the comparative examples, the difference in the slump value is up to about 10% between immediately after mixing and 60 minutes after mixing. On the other hand, in the case of the examples, there is no significant difference in the slump value between immediately after mixing and 60 minutes after mixing.

In addition, in the case of the compressive strength, it can be clearly confirmed that the examples of the present disclosure have much higher values 7 days after mixing than 3 days after mixing as compared with the comparative examples. Specifically, the compression strength value difference is as high as about 20%.

On the other hand, referring to Comparative Examples 1 and 2 in which the repeating unit derived from the specific monomer was omitted and no cross-linking agent was used, it was confirmed that the slump loss was significant and the compressive strength was greatly decreased. Further, with reference to Comparative Examples 3 to 5 in which the cross-linking agent was used but the repeating unit derived from the specific monomer was absent, or all the repeating units were included but cross-linking was not formed by the cross-linking agent, it was confirmed that the compressive strength was greatly decreased. In all of the comparative examples, the polycarboxylic acid-based copolymer has the weight average molecular weight of less than about 30,000. These results are presumed to be due to changes in the internal structure of the polycarboxylic acid-based copolymer which is a cement additive.

When cement is formulated by adding the cement additive composition according to an embodiment of the present disclosure, it is expected that it can be applied to various applications such as buildings because of excellent processability and high compression strength after hardening.

The invention claimed is:

1. A cement additive composition comprising a polycarboxylic acid-based copolymer,
    wherein the polycarboxylic acid-based copolymer comprises an alkoxypolyalkylene glycol (meth)acrylic acid ester-based repeating unit, a polyalkylene glycol ether-based repeating unit, and a (meth)acrylic acid-based repeating unit, and is cross-linked by an ethylene glycol di(meth)acrylate-based cross-linking agent,
    wherein in the polycarboxylic acid-based copolymer, the polyalkylene glycol ether-based repeating unit is included in an amount of 50 to 150 parts by weight, the (meth)acrylic acid-based repeating unit is included in an amount of 20 to 40 parts by weight, and the ethylene glycol di(meth)acrylate-based cross-linking agent is included in an amount of 0.05 to 0.3 parts by weight, respectively, based on 100 parts by weight of the alkoxypolyalkylene glycol (meth)acrylic acid ester-based repeating unit,
    wherein the alkoxypolyalkylene glycol (meth)acrylic acid ester-based repeating unit is derived from a monomer represented by the following Chemical Formula 1:

[Chemical Formula 1]

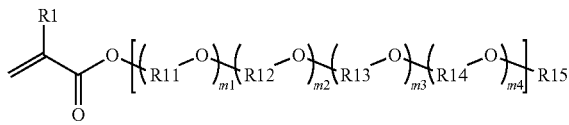

wherein, in Chemical Formula 1,
R1 is a C1 alkyl,
R11 to R14 are the same and each is a C1 to C4 alkylene,
m1 to m4 are the same as or different from each other, and each is independently an integer of 0 to 100, and m1+m2+m3+m4 is 50 to 100, and
R15 is hydrogen or a C1 to C4 alkyl,
wherein the polyalkylene glycol ether-based repeating unit is derived from a monomer represented by the following Chemical Formula 2:

[Chemical Formula 2]

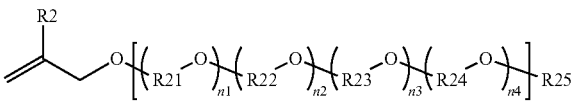

wherein, in Chemical Formula 2,
R2 is a C1 alkyl,
R21 to R24 are the same and each is a C1 to C4 alkylene,
n1 to n4 are the same as or different from each other, and each is independently an integer of 0 to 100, and n1+n2+n3+n4 is 50 to 100, and R25 is a C1 to C4 alkyl.

2. The cement additive composition of claim 1, wherein the (meth)acrylic acid-based repeating unit is derived from a monomer represented by the following Chemical Formula 3:

[Chemical Formula 3]

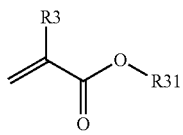

wherein, in Chemical Formula 3,
R3 is hydrogen or a C1 to C3 alkyl, and
R31 is hydrogen, a monovalent or divalent metal ion, an ammonium ion, or a primary to quaternary ammonium ion.

3. The cement additive composition of claim 2, wherein the monomer represented by Chemical Formula 3 is at least one selected from the group consisting of acrylic acid, methacrylic acid, metal salts of said acids, ammonium salts of said acids, and organic amine salts of said acids.

4. The cement additive composition of claim 1, wherein the ethylene glycol di(meth)acrylate-based cross-linking agent is at least one selected from the group consisting of polyethylene glycol diacrylate (PEGDA), polypropylene glycol diacrylate (PPGDA), 1,6-hexanediolethoxylate diacrylate, 1,6-hexanediolpropoxylate diacrylate, neopentylene glycol ethoxylate diacrylate, neopentylene glycol propoxylate diacrylate, trimethylpropane ethoxylate triacrylate, trimethylpropane propoxylate triacrylate, pentaerythritol ethoxylate triacrylate, and pentaerythritol propoxylate triacrylate.

5. The cement additive composition of claim 1,
further comprising
at least one of a metal salt of the polycarboxylic acid-based copolymer or an ammonium salt of the polycarboxylic acid-based copolymer.

6. The cement additive composition of claim 1, wherein the polycarboxylic acid-based copolymer has a weight average molecular weight of 30,000 to 70,000 g/mol.

* * * * *